US011921607B2

(12) United States Patent
Pinjala et al.

(10) Patent No.: US 11,921,607 B2
(45) Date of Patent: Mar. 5, 2024

(54) EXECUTING TARGETED WORKLOADS IN VIRTUAL DESKTOP ENVIRONMENTS USING INPUT ENCODED INTO DIGITAL IMAGES

(71) Applicant: VMware LLC, Palo Alto, CA (US)

(72) Inventors: Srinivas Shyam Pinjala, Bangalore (IN); Lakshmi Gayatri Kundem, Bangalore (IN); Duraipandian Kuppuraman, Bangalore (IN); Janani Karthikeyan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 507 days.

(21) Appl. No.: 17/065,522

(22) Filed: Oct. 8, 2020

(65) Prior Publication Data

US 2022/0114072 A1   Apr. 14, 2022

(51) Int. Cl.
| | |
|---|---|
| G06F 11/34 | (2006.01) |
| G06F 9/451 | (2018.01) |
| G06F 9/455 | (2018.01) |
| G06F 11/30 | (2006.01) |
| G06F 11/32 | (2006.01) |

(52) U.S. Cl.
CPC .......... *G06F 11/3414* (2013.01); *G06F 9/452* (2018.02); *G06F 9/45558* (2013.01); *G06F 11/301* (2013.01); *G06F 11/328* (2013.01); *G06F 2009/45591* (2013.01)

(58) Field of Classification Search
CPC .. G06F 11/3006; G06F 11/301; G06F 11/302; G06F 11/328; G06F 11/3414; G06F 11/3428; G06F 3/01; G06F 9/452; G06F 9/45558; G06F 2009/45591
USPC ........................................................ 702/186
See application file for complete search history.

(56) References Cited

U.S. PATENT DOCUMENTS

| | | | |
|---|---|---|---|
| 8,495,584 B2 * | 7/2013 | Beaty .................. | G06F 11/3414 709/224 |
| 9,516,020 B2 * | 12/2016 | Jiang .................... | G06F 3/01 |
| 2013/0332610 A1 * | 12/2013 | Beveridge ........... | G06F 9/45558 709/226 |
| 2016/0057135 A1 * | 2/2016 | Jiang .................... | H04L 63/08 713/172 |
| 2019/0230152 A1 * | 7/2019 | Wang .................... | G06F 16/188 |

* cited by examiner

*Primary Examiner* — John H Le
(74) *Attorney, Agent, or Firm* — King Intellectual Asset Management

(57) ABSTRACT

Techniques are described providing improved ways to benchmark and validate virtual desktop deployments where targeted workloads are delivered to virtual desktops based on parameters such as the desktop type and origin, and where workload operations can be triggered from the client device. Client instructions for performing workload operations can be encoded into a digital image such as a Quick Response (QR) code on the virtual desktop and inserted into the virtual desktop graphical user interface (GUI). The client decodes the digital image in the received GUI to obtain the instructions and actuate the operations. Completion of operations can be tracked to benchmark desktop performance.

21 Claims, 4 Drawing Sheets

EXECUTING TARGETED WORKLOADS IN VIRTUAL DESKTOP ENVIRONMENTS USING INPUT ENCODED INTO DIGITAL IMAGES

TECHNICAL FIELD

The present disclosure generally relates to virtual desktop environments and more specifically to techniques for executing targeted workloads on a virtual desktop that are initiated based on input encoded into a digital image such as a Quick Response (QR) code.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and can access his or her virtual desktop over a remote network connection, such as a WAN connection. The virtual desktops are typically hosted on servers that reside in a data center of the enterprise or a third-party service provider, and each host server may execute multiple virtual desktops. Users can utilize a client device to remotely log into their individual virtual desktop and all of the application execution takes place on the remote virtual desktop host server that is linked to the local client device over a network using a remote display protocol, such as remote desktop protocol (RDP), PC-over-IP protocol (PCoIP), VMware Blast, virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines (VMs) deployed on a server hardware platform running a hypervisor.

Until recently, virtualized desktop infrastructure was predominantly hosted on-premises by enterprises, and this is still a common approach. Companies such as VMware Inc. and Citrix Systems, Inc. are providers of such desktop virtualization solutions. In recent years, however, the infrastructure for hosting virtual desktops has been moving to the cloud. With this approach, instead of being served from an on-premises infrastructure, the desktops are served from the cloud. That is, the virtual desktop infrastructure can be located on a remote server owned by a third-party provider that hosts the infrastructure and provides desktop access to users. Companies such as Amazon.com Inc. and Microsoft Corporation are providers of such services. Organizations can now choose to have virtual desktops for some members of the organization (e.g., for the development teams) be served from an on-premises VDI infrastructure, while virtual desktops for other members (e.g., for the support organization) can be served from a cloud infrastructure. Different end users can receive virtual desktops from different infrastructures, depending on the requirements.

However, validation, testing, and assessment of user experience in such virtual desktop deployments can pose challenges due to a lack of solutions that can trigger a specific workload on a specific desktop originating from on-premises or cloud infrastructure. Such validations and testing can include functional testing, load testing, system testing, benchmarking performance testing, resiliency/failover testing, etc.

Currently, various tools and solutions are available for load testing/performance benchmarking in virtual desktop environments, such as Login VSI (available from Login VSI Inc.), View Planner (available from VMware Inc.), and Reference Architecture Workload Code (RAWC) (available from VMware Inc.). Such tools generally utilize agent software running with the virtual desktop software on the remote virtual desktop's operating system and an agent on the desktop client where the virtual desktop is rendered. The client launches the virtual desktop and once the desktop session is successfully initiated, a predefined set of instructions are triggered on the remote operating system. This instruction script is usually made available to the remote operating system either from a file share or a launcher. Generally, such tools perform a set of operations called workloads on applications such as Word, Excel, PowerPoint, media player, browsers, etc.

However, in many cases these approaches fail to perform accurate validation and benchmarking in virtual desktop environments. The operations typically simulate mouse or keyboard inputs directly on the remote operating systems and are not driven by actions that are initiated on the client device, as would occur in a real-world deployment. This methodology often results in one-way network traffic between the remote operating system and the client device. There are no actions and traffic originating from the client and going to the remote operating system, and operations are not triggered on the client device. In addition, only one type of workload is typically exercised on the desktop at any given point in time. The same operations may be repeated over and over without variation. All of this can result in inaccurate validation and benchmarking.

What is needed is a more efficient way for executing targeted workloads in virtual desktop environments.

DETAILED DESCRIPTION

Figure 1:
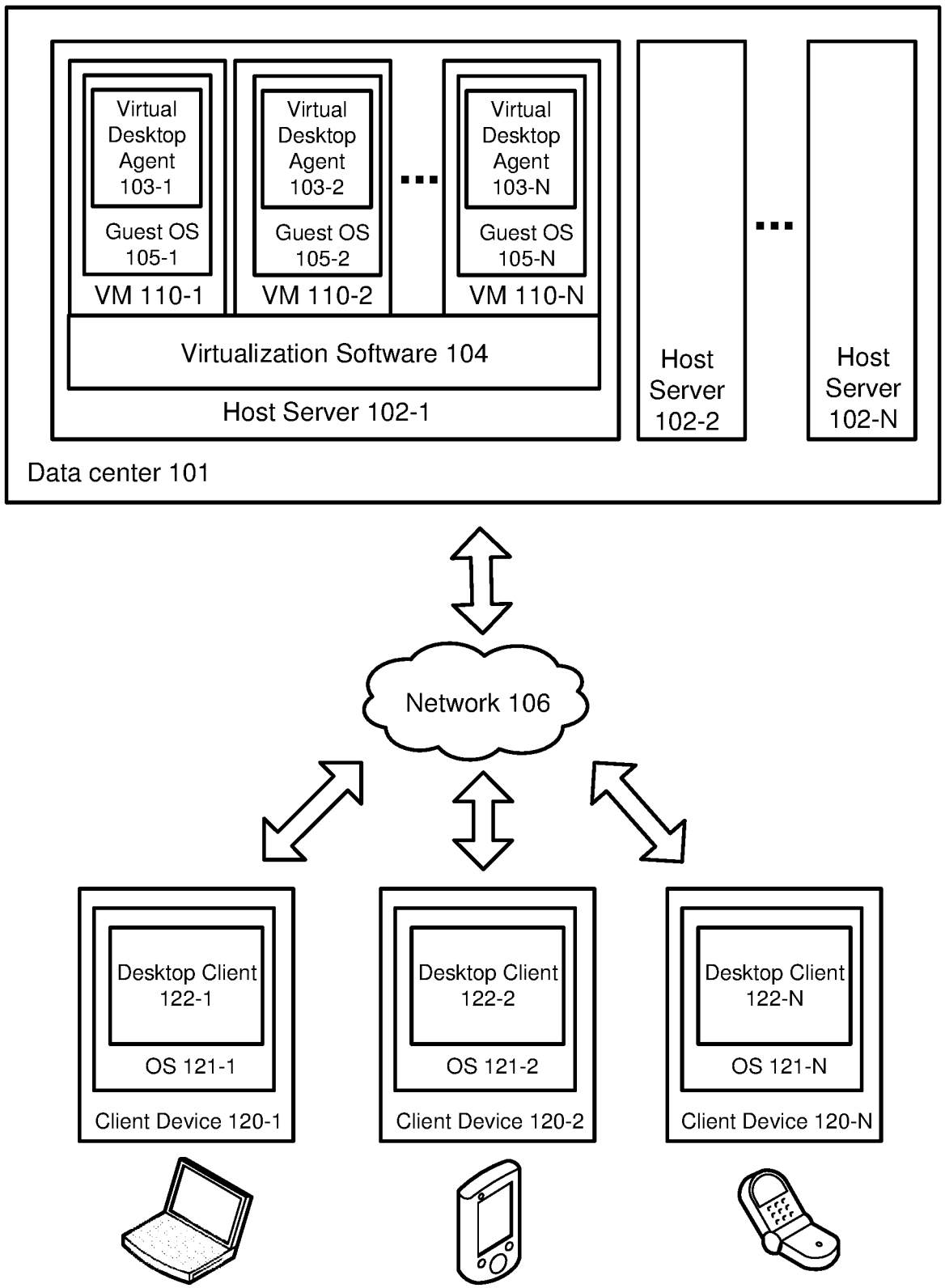
FIG. 1 illustrates an example of a virtual desktop environment, in accordance with various embodiments.

Systems and methods in accordance with various embodiments of the present disclosure overcome at least some of the above-mentioned shortcomings by providing ways for executing targeted workloads in a virtual desktop session with workload operations triggered from the client side. In particular, client instructions for performing workload operations can be encoded into a digital image, such as a Quick Response (QR) code, that is inserted into the virtual desktop graphical user interface (GUI). The client can decode the digital image in the received GUI to obtain the instructions and perform the operations. Completion of operations can be tracked to benchmark desktop performance.

In various embodiments, the system can comprise a controller that drives benchmarking on virtual desktops and provides an interface for administrators. A client benchmarking component can run on the user client device in conjunction with the desktop client to enable corresponding benchmarking operations on the client, and an agent benchmarking component can run on the virtual desktop in conjunction with the virtual desktop agent to enable corresponding benchmarking operations on the server. The process can begin by the controller issuing a command to launch a virtual desktop session. Once the session is launched, the virtual desktop user interface or GUI can be conveyed from the virtual desktop and presented on the client via a remoting protocol.

The agent can query the virtual desktop operating system for information, such as its IP address, type (e.g., operating system), and origin (e.g., underlying infrastructure (cloud service, on-premises, etc.)). The agent can embed this information into a QR code and display the QR code in the GUI of the virtual desktop being streamed to the client device. The client can poll for the initial QR code and once the QR code is detected, the client can confirm that a session has been launched successfully. This can eliminate the need to query brokering software to determine if the session is established as was done in conventional technologies.

The client can convey the virtual desktop information obtained from the initial QR code to the controller. Based on the conveyed information, the controller can determine a workload for benchmarking the virtual desktop and establish a client-to-agent mapping. For example, different workloads may be used for virtual desktops having different operating systems, different infrastructure (cloud service, on-premises, etc.) or other factors. Based on the information provided from the client, the controller can identify a targeted workload for the virtual desktop and convey the workload to the agent.

In various embodiments, the workload can be a predefined sequence of input operations to be performed on the virtual desktop for benchmarking and validation purposes. When the workload is executed, the operations can be carried out in sequence and completion of the operations can be tracked and timed to benchmark or validate performance. As will be described in further detail below, in various embodiments a portion of the workload operations can be triggered by the agent directly on the virtual desktop and a portion of the workload operations can be triggered by the client remotely to better simulate real-world use scenarios.

Once the agent receives the workload, the agent can begin to execute it. The workload can specify which operations are to be performed by the agent on the virtual desktop and which operations are to be performed by the client on the client device. When the workload calls for operations to be performed by the agent, the agent can execute those operations on the virtual desktop directly. When the workload calls for operations to be performed by the client, the agent can embed instructions for performing those operations in a QR code and display the QR code in the GUI being streamed to the client (e.g., by inserting the QR code into the GUI). The client can scan the QR code in the received GUI, obtain the instructions for performing the workload operations by decoding the QR code, and carry out or actuate the workload operations. The completion of workload operations can be tracked to benchmark the performance of the virtual desktop.

As a result, an improved and more accurate way to benchmark and validate virtual desktop deployments is provided where targeted workloads can be delivered to virtual desktops based on parameters such as the desktop type and origin, and where workload operations can be triggered from the client device.

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a desktop client or virtual desktop client (e.g., 122-1, 122-2, 122-N). For example, the desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the desktop client and the desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
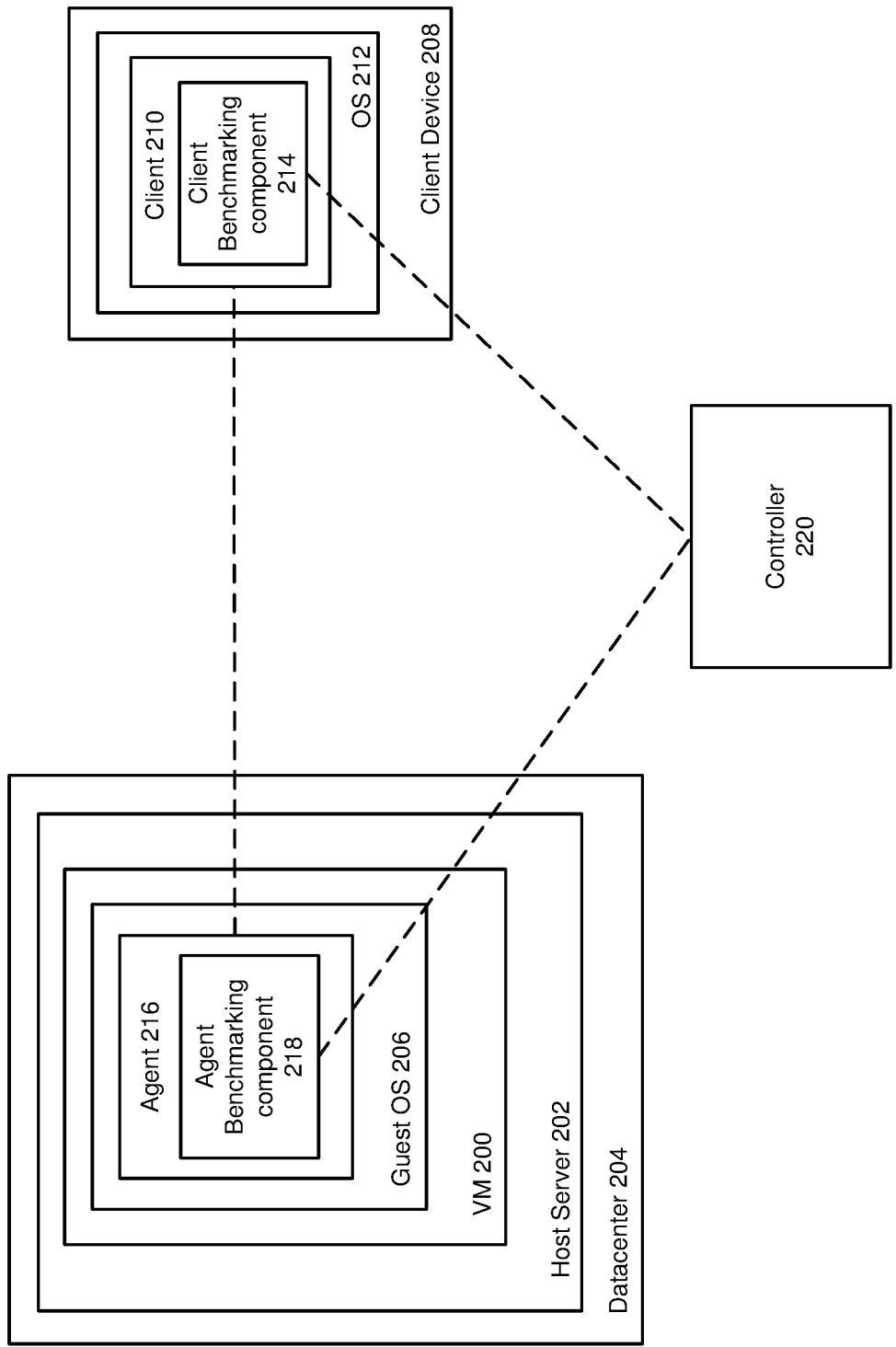
FIG. 2 illustrates an example architecture of a system for executing targeted workloads in virtual desktop environments, in accordance with various embodiments.

FIG. 2 illustrates an example architecture of a system for executing targeted workloads in virtual desktop environments, in accordance with various embodiments. As illustrated in this example, the system includes a controller 220, which can be a software module that drives benchmarking on virtual desktops. The controller 220 can reside on a computing device, which may be in a datacenter or on a server and provide an interface for administrators to configure and administer benchmarking and validation testing on virtual desktops.

A VM 200 can run on a host server 202 in a datacenter 204 to provide a virtual desktop that is presented by a guest OS 206 and accessed by a remote client device 208 connected to the VM 200 over a network. While only one VM 200 is illustrated in this example, a real-world implementation may include multiple VMs hosted on the server 202, as in the example of FIG. 1. The datacenter 204 may be an on-premises datacenter of an enterprise or a cloud-based datacenter. As will be appreciated by those skilled in the art, the configuration of the components in FIG. 2 is given by way of example only and other configurations are possible without straying from the spirit of the invention.

Interaction between the virtual desktop and the client device 208 can be facilitated by a client 210 running in an OS 212 on the client device 208, which communicates with a server-side agent 216 running on the guest OS 206 in the virtual machine 200. In particular, the interaction can be performed by the agent 216 transmitting encoded visual display information (e.g., framebuffer data) over the network to the client 210 and the client 210 in turn transmitting user input events to the agent 216. The client 210 can access the virtual desktop by connecting to the remote desktop via the agent 216 (e.g., after login credentials are confirmed). Once the client 210 is connected to the agent 216, the GUI of the remote desktop can be streamed by the agent 216 to the client 210 and displayed in the client 210 window on the client device 208.

To enable benchmarking functionality, the client 210 and agent 216 can contain a client benchmarking component 214 and an agent benchmarking component 218, respectively, that can run on, or in conjunction with, the client 210 and agent 216 to perform corresponding benchmarking operations, as described herein.

In various embodiments, the controller 220 can contain a list of clients (e.g., including client 210), which the controller 220 can access over a network connection, for example, to launch corresponding virtual desktop sessions for benchmarking. As will be appreciated by those skilled in the art, even though the example of FIG. 2 illustrates a single client device 208 and VM 200, in a real-world scenario the controller would generally have access to and perform benchmarking operations on several virtual desktops. Notably, the controller 220 may have access to clients and agents for running workloads on virtual desktops that may have different origins (e.g., which may be hosted on different types of infrastructures, such as on-premises, on the cloud, etc.) and of different types (e.g., which may run on different operating systems such as Windows, Linux, etc.).

As will be described in greater detail in FIG. 3 below, the controller 220 can initiate a benchmarking workload on the virtual desktop presented by the VM 200 by issuing a command to launch a virtual session on the corresponding client 210 of the virtual desktop. After the virtual session is launched, the controller can be supplied by the client 210 with virtual desktop information (such as desktop type and origin), which the client 210 can obtain from the agent 216. Based on this information, the controller 220 can determine an appropriate workload for the virtual desktop and convey the workload to the desktop agent 216 to be performed. This way, the controller can push different targeted workloads to different virtual desktops based on parameters such as the desktops' operating system, hosting infrastructure, etc.

In various embodiments, the workload received by the agent 216 can include agent operations to be performed by the agent 216 and client operations to be performed by the client 210. The agent 216 can perform the agent operations in the virtual desktop itself. For operations in the workload to be performed by the client 210, the agent 216 can encode instructions for performing the client operations in a QR code and display the QR code in the desktop GUI conveyed to the client 210. The client 210 can receive the QR code in the transmitted GUI, decode the instructions from the QR code, and actuate the operations.

Generally, a QR code is a type of well-known matrix barcode (or two-dimensional barcode) which was first designed for the automotive industry in Japan. The QR code is a machine-readable optical label that contains information about the item to which it is attached. The QR code encodes data into an image which can be read by another machine. In various embodiments described herein, the QR code can be used to transmit data from an agent (e.g., 218) to a client (210) (e.g., by including the QR code in the GUI). In various embodiments, the QR code can be displayed on the screen of a client device (e.g., 208) and be encoded with information, such as instructions for workload operations or virtual desktop information, in accordance with various embodiments described throughout this disclosure. The QR code may be embedded into the GUI by the desktop agent (e.g., 216) operating on the host server (e.g., 202) at any number of different locations or times.

In various embodiments, other types of digital images that can be encoded with data can be used instead of QR codes. One example is watermarks that are encoded with data. In this case, the agent 216 can encoded data such as instructions for workload operations or virtual desktop information into a watermark (e.g., using a watermarking algorithm) and insert the watermark into the transmitted GUI. The client 210 can then decode the watermark and extract the information.

Figure 3:
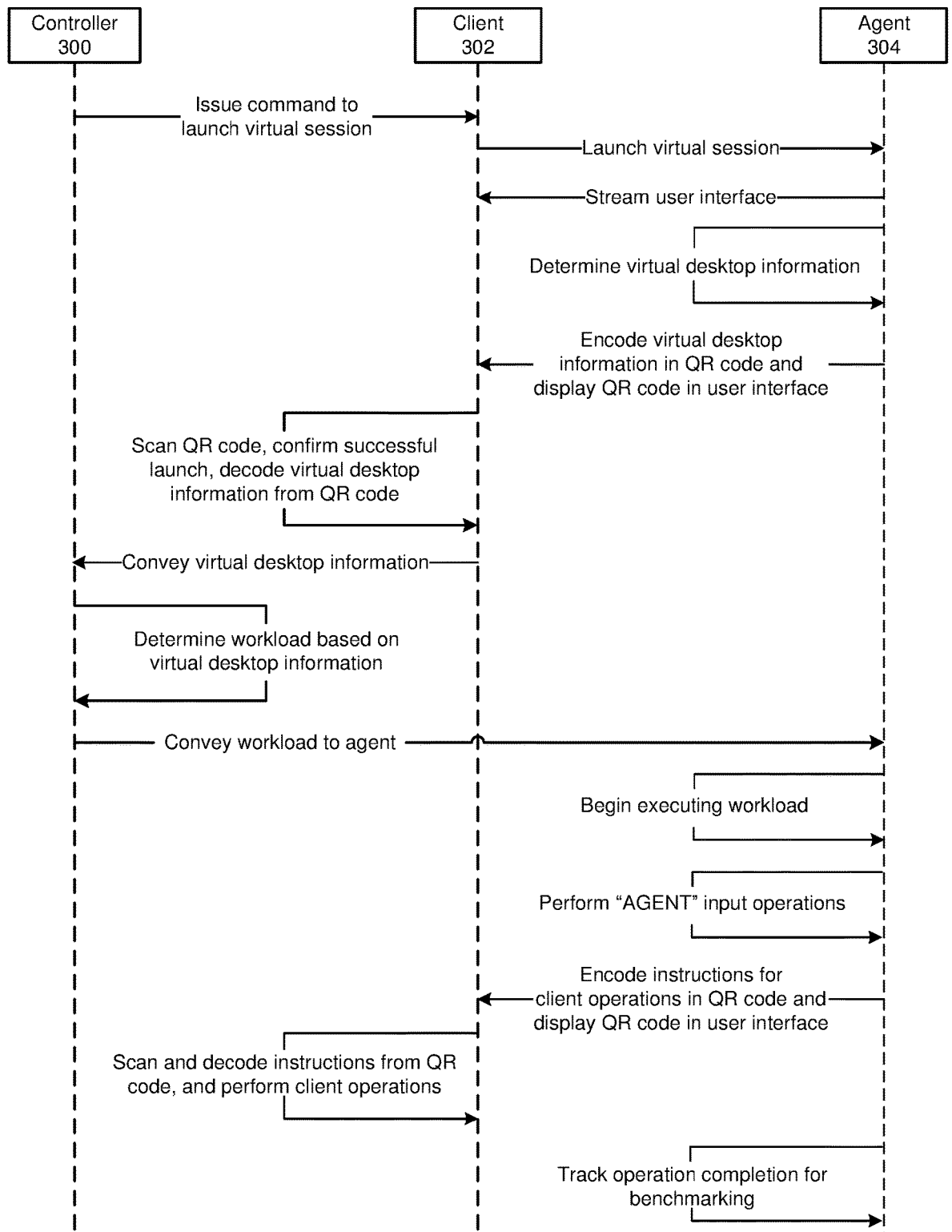
FIG. 3 illustrates an example diagram of a process for executing a targeted workload on a virtual desktop, in accordance with various embodiments.

FIG. 3 illustrates an example diagram of a process for executing a targeted workload on a virtual desktop, in accordance with various embodiments. The process can begin by a controller 300 issuing a command to launch a virtual desktop session. For example, the controller 300 may have a list of desktop clients on which virtual desktop sessions can be launched for benchmarking purposes. The controller 300 can identify the desktop client 302, which may be running on a client device, from the list and send a command to the client 302 to launch the virtual desktop session.

In response to the command from the controller 300, the client 302 can launch the virtual desktop session on a remote desktop. For example, a virtual desktop can be executed on a remote server and the client 302 can connect to a virtual desktop agent 304 executing in the desktop over a network connection by providing login credentials (which can be stored on the client device) to the VDI software (e.g., via a connection broker). After the client 302 is authenticated, the virtual desktop can be prepared and presented in the client 302 via remoting protocols.

Once the virtual desktop session is established, the agent 304 can stream a user interface (i.e., the GUI) of the virtual desktop to the desktop client 302 over the network connection. The connection can further permit inputs on the client 302 to be conveyed to the agent 304 to be actuated in the virtual desktop.

After the virtual desktop is prepared, the agent 304 can determine various information corresponding to the virtual desktop, which can later be used to determine a workload for the virtual desktop and to deliver the workload to the agent 304. For example, the agent 304 can query the virtual desktop operating system for this information. Such information can include an address corresponding to the virtual desktop, such as the IP address of the virtual desktop (or of the agent 304), which can be used by the controller 300 in a later step to convey the workload to the agent 304. The information can further include various information that can be used to determine (e.g., by the controller) a workload to use for the virtual desktop, such as information identifying the type of virtual desktop (e.g., the operating system of the virtual desktop), information identifying the origin of the virtual desktop (e.g., the underlying virtualization infrastructure of the virtual desktop), or any other information that may be used for determining a workload to assign to the virtual desktop for benchmarking.

For example, different workloads may be indicated for different types of desktops (e.g., for different operating systems such as Windows, Linux, etc.). Different workloads may also be indicated for different origins (or infrastructures). For example, a different workload may be indicated for on-premises desktops than cloud-based desktops (e.g., desktops hosted on third-party servers). Further, different workloads may be indicated for each different cloud-service provider.

Hence, the virtual desktop information determined by the agent 304 can include information identifying the type of desktop, such as the type of operating system of the virtual desktop or guest OS (e.g., the name and version of the OS such as Windows, Linux, etc.). The information can further include information identifying the origin of the desktop, such as the type of underlying virtualization infrastructure of the virtual desktop (e.g., on what host and/or server the virtual desktop resides); whether the virtual desktop is on an on-premises infrastructure or is cloud-based (e.g., on a third-party server); whether the desktop is on the server of a particular service provider (e.g., Amazon AWS, Microsoft Azure), etc.

Such information identifying the type and origin of the desktop and any other provided details can be used in later steps by the controller 300 to determine a workload for the desktop. In various embodiments, any information (other than desktop type and origin) that can have an effect on the workload indicated for the virtual desktop may likewise be determined or obtained by the agent 304 and used in later steps to determine a workload for the virtual desktop.

After the agent 304 determines the virtual desktop information, it can encode the virtual desktop information in a QR code and display the QR code in the virtual desktop user interface, as illustrated. For example, the agent 304 can display the QR code in the GUI being streamed to the client 302 (e.g., in a predetermined location of the virtual desktop user interface).

When the virtual session is established, the client 302 can wait or poll for a QR code to appear in the user interface. For example, it can scan the user interface to identify when a QR code appears. When the agent 304 displays the QR code with the virtual desktop information in the user interface, the client 302 can detect the QR code and scan it to decode the virtual desktop information from the QR code. In various embodiments, once the client 302 detects this initial QR code, it can confirm that the session has launched successfully. This can eliminate the need present in past solutions to query the brokering software to determine if the session is established.

As illustrated, after decoding the virtual desktop information from the QR code, the client 302 can convey the virtual desktop information to the controller 300 (for example, over a network connection established between the client 302 and the controller 300).

Based on the virtual desktop information received from the client 302, the controller 300 can determine a workload for the virtual desktop. For example, the virtual desktop information can include the type and origin of the virtual desktop and the controller 300 can determine a workload that is indicated for the provided type and/or origin of the virtual desktop. In an embodiment, the controller 300 can store a plurality of pre-defined workloads (which may be designed and uploaded by an administrator) and the controller 300 can determine which of the pre-define workloads to use for the desktop based on the provided virtual desktop information (e.g., based on the type, origin, or any other information about the desktop). For example, different workloads can be indicated in the controller (e.g., by a rule, list, or data structure) for different types or different origins of virtual desktops. In an embodiment, the controller can contain a rule or data structure that indicates for each type and/or origin of virtual desktop in the applicable deployment, which of a number of stored workloads to implement, and the controller can determine a workload to use for the virtual desktop based on such rule.

As illustrated, after the controller 300 determines a workload to implement on the virtual desktop, it can convey the workload to the agent 304 (e.g., over a network connection). In various embodiments, the controller 300 can obtain the address of the agent 304 or virtual desktop from the virtual desktop information that the controller 300 received from the client 302 previously and send the workload to that address.

After it receives it, the agent 304 can begin to execute the workload. In various embodiments, the workload can comprise a sequence of input operations (e.g., a script containing input operations). The workload can identify input operations in the sequence that are to be executed/performed by the agent 304 and input operations in the sequence that are to be executed/performed by the client 302. For example, input operations to be performed on the client 302 can be marked or tagged "CLIENT" or another designation in the workload to indicate that they are to be performed on the client 302, and input operations to be performed on the agent 304 can be marked or tagged "AGENT" or another designation in the workload to indicate that they are to be performed on the agent 304.

Once the agent 304 begins executing the workload, it can proceed sequentially through the workload steps or operations. As illustrated, the agent 304 can perform input operations marked as "AGENT" (i.e., operations indicated to be performed by the agent 304 in the workload). The agent 304 can perform these operations itself in the virtual desktop (e.g., in the guest operating system).

The agent 304 can identify operations in the workload to be performed by the client 302 (e.g., the agent 304 can read operations marked or tagged as "CLIENT" in the workload). The agent 304 can encode the "CLIENT" input operations into a QR code and display the QR code in the user interface to convey the operations to the client 302. For example, the agent 304 can construct a series of instructions for the client 302 for performing the client operations and, as illustrated, the agent 304 can encode the constructed instructions into a QR code and display the QR code in the desktop user interface. The agent 304 can display the QR code in the GUI being streamed to the client 302 (e.g., in a predetermined location of the virtual desktop user interface).

In various embodiments, when a client operation requires locating a user interface element (e.g., when an operation references a user interface element) in the user interface, the agent 304 can determine the location of the user interface element in the virtual desktop user interface and include the determined location in the instructions for corresponding operations encoded into the QR code. The location of the user interface element can be encoded into the QR code with the instructions for performing the "CLIENT" operations. In various embodiments, to obtain the user interface element location, the agent 304 can request and receive the location of the user interface element from the operating system of the virtual desktop. In an embodiment, the agent 304 can use a guest operating system's accessibility features and determine the location of user interface elements using such features.

In various embodiments, the client 302 can wait or poll for a QR code to appear in the user interface. For example, it can scan the user interface to identify when a QR code appears. When the agent 304 displays the QR code with the instructions for client operations in the user interface, the client 302 can detect the QR code. As illustrated, the client 302 can scan and decode the QR code, read the instructions for client operations from the QR code and perform the client operations. In various embodiments, the client 302 can read the instructions and perform the appropriate operations by computing the relative co-ordinates of user interface elements and performing the operations in the client 302. The client 302 can actuate the sequence of input operations encoded in the QR code. This way, operations in the workload can be driven from the client 302.

As illustrated, the agent 302 can track completion of workload input operations for benchmarking the virtual desktop performance. The agent 302 can track completion of both agent and client operations. For example, a plugin can be added on the agent to determine the time it takes to perform the input operations (both client and agent input operations) and this information can be used for benchmarking desktop performance. In an embodiment, the completion of input operations can be tracked on the client 302 in addition to or instead of on the client 304. In various embodiments, the system can track completion at every step of the workload sequence (e.g., for each input operation). The system can track whether each operation is completed successfully and/or the time each operation takes to complete for benchmarking performance.

Provided below is an example of pseudo code for a script/workload:
Step 1: AGENT: Open Microsoft Word application.
Step 2: CLIENT: Agent determines and informs the client of the location of the menu bar with the title "File" AND instructs the client to click on that location.
Step 3: AGENT: Wait for "New" menu item to appear.
Step 4: CLIENT: Agent determines and informs the client of the location of "New" item AND instructs the client to click on that location.
Step 5: AGENT: Wait for "BLANK Document".
Step 6: CLIENT: Agent instructs client to click on middle of the document and type text "abc".
Step 7: AGENT: Wait for "abc" to appear on the document.
Step 8: CLIENT: Agent determines and informs the client of the location of "File" AND informs the client to click on that location.
Step 9: AGENT: Wait for "Save as" menu item to appear.
Step 10: CLIENT: Agent determines and informs the client of the location of "Save" button AND instructs client to type "abc.doc" and to click on the location of the "Save" button.
Step 11: CLIENT: Agent determines and informs the client of the location of menu bar with title "File" AND instructs the client to click on that location.
Step 12: AGENT: Wait for "Close" menu item to appear.
Step 13: CLIENT: Agent determines and informs the client of the location of the "Close" menu item AND instructs the client to click on that location.

The above example pseudo code contains 13 steps and each step is marked "CLIENT" or "AGENT" to indicate where the corresponding operation are to be performed. When the agent receives the workload, it can proceed to execute the operations sequentially. Steps marked "AGENT" (Steps 1, 3, 5, 7, 9, 12) can each be performed by the agent in the virtual desktop. For each of the steps marked "CLIENT" (Steps 2, 4, 6, 8, 10, 11, 13) the agent can convey instructions for performing the corresponding operations in the step to the client by encoding the instructions in a QR code and displaying the QR code in the user interface, as described above. The system can track completion of all or any of the steps (e.g., via a plugin) and record the time required to complete the steps (or to complete the entire workload) to benchmark performance of the desktop.

For example, in Step 1, the agent can open the Microsoft Word application in the virtual desktop without the client performing any operations. In Step 2, the agent can determine the location of the menu bar "File" in the user interface (e.g., by obtaining the information from the operating system) and construct an instruction to the client to click on that location. The agent can encode the instruction in a QR code and display the QR code in the user interface to convey the instruction to the client. The client can decode the instruction from the QR code and perform it. Then, in Step 3, the agent can wait for the "New" menu item to appear. The system can record the amount of time it takes for the "New" menu item to appear for benchmarking the desktop. In a similar fashion, the agent and client can proceed through the remainder of the workload in the pseudo code.

Figure 4:
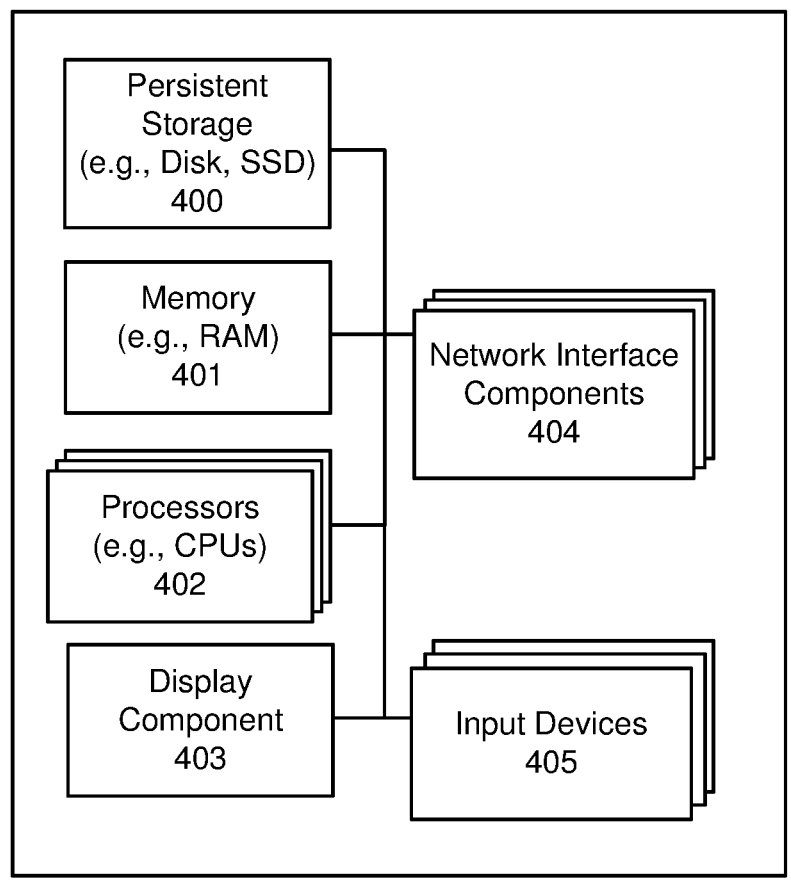
FIG. 4 illustrates an example of some general components of a computing device, in accordance with various embodiments.

FIG. 4 illustrates an example of some general components of a computing device, in accordance with various embodiments. In this particular example, the device includes one or more processors (e.g., central processing units (CPUs) 402 for executing instructions that can be stored in a storage medium component. The storage medium can include many types of memory, persistent data storage, or non-transitory computer-readable storage media. For example, the storage medium may take the form of random access memory (RAM) 401 storing program instructions for execution by the processor(s) 402, a persistent storage (e.g., disk or SSD) 400, a removable memory for sharing information with other devices and/or the like. The computing device typically can further comprise a display component 403, such as a monitor, a touch screen, liquid crystal display (LCD), or the like. In various embodiments, the computing device will include at least one input device 405 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 404 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used, and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

As a result, an improved and more accurate way to benchmark and validate virtual desktop deployments is provided where targeted workloads can be delivered to virtual desktops based on parameters such as the desktop type and origin, and where workload operations can be triggered from the client device.

What is claimed is:

1. A method for executing workloads to benchmark virtual desktop performance in a virtual desktop environment, the method comprising:
    establishing a virtual desktop session between a virtual desktop agent and a desktop client, wherein the virtual desktop agent is configured to stream a user interface of the virtual desktop to the desktop client over a network connection;
    by the virtual desktop agent, determining information corresponding to the virtual desktop comprising at least one of a type of operating system of the virtual desktop and where the virtual desktop is hosted, wherein a sequence of input operations for benchmarking performance of the virtual desktop is determined by a controller based on the information corresponding to the virtual desktop;
    receiving, by the virtual desktop agent, the sequence of input operations to be performed for benchmarking performance of the virtual desktop;
    encoding at least a portion of the sequence of input operations for benchmarking performance of the virtual desktop into a digital image by the virtual desktop agent; and
    displaying the digital image encoded with the sequence of input operations for benchmarking performance of the virtual desktop on the user interface of the virtual desktop, wherein the desktop client is configured to decode the digital image displayed in the user interface and actuate the sequence of input operations encoded in the digital image.

2. The method of claim 1, further comprising:
    executing a first portion of the sequence of input operations by the virtual desktop agent; and
    encoding a second portion of the sequence of input operations into the digital image by the virtual desktop agent.

3. The method of claim 1, further comprising:
    by the virtual desktop agent, receiving from an operating system of the virtual desktop a location in the user interface of a user interface element referenced in the sequence of input operations encoded into the digital image; and
    encoding the location of the user interface element into the digital image.

4. The method of claim 1, further comprising:
    by the virtual desktop agent, determining information corresponding to the virtual desktop comprising at least one of a type of the virtual desktop and an origin of the virtual desktop, wherein the sequence of input operations received by the virtual desktop agent is determined based on the information determined by the virtual desktop agent.

5. The method of claim 1, further comprising:
    by the virtual desktop agent, determining information corresponding to the virtual desktop comprising at least one of a type of the virtual desktop and an origin of the virtual desktop;
    encoding the information into a digital image by the virtual desktop agent; and
    displaying the digital image encoded with the information on the user interface of the virtual desktop, wherein the desktop client is configured to decode the digital image displayed in the user interface and convey the information to a controller, wherein the sequence of input operations received by the virtual desktop agent is determined by the controller based on the information received from the desktop client.

6. The method of claim 1, wherein the digital image is at least one of a Quick Response (QR) code or a watermark.

7. The method of claim 1, further comprising tracking completion of the input operations for benchmarking the virtual desktop.

8. A computing device for executing workloads to benchmark virtual desktop performance in a virtual desktop environment, comprising:
    at least one processor; and
    memory including instructions that, when executed by the at least one processor, cause the computing device to perform the steps of:

establishing a virtual desktop session between a virtual desktop agent and a desktop client, wherein the virtual desktop agent is configured to stream a user interface of the virtual desktop to the desktop client over a network connection;

by the virtual desktop agent, determining information corresponding to the virtual desktop comprising at least one of a type of operating system of the virtual desktop and where the virtual desktop is hosted, wherein a sequence of input operations for benchmarking performance of the virtual desktop is determined by a controller based on the information corresponding to the virtual desktop;

receiving, by the virtual desktop agent, the sequence of input operations to be performed for benchmarking performance of the virtual desktop;

encoding at least a portion of the sequence of input operations for benchmarking performance of the virtual desktop into a digital image by the virtual desktop agent; and displaying the digital image encoded with the sequence of input operations for benchmarking performance of the virtual desktop on the user interface of the virtual desktop, wherein the desktop client is configured to decode the digital image displayed in the user interface and actuate the sequence of input operations encoded in the digital image.

9. The computing device of claim 8, wherein the memory further includes instructions that when executed by the at least one processor, cause the computing device to perform the steps of:

executing a first portion of the sequence of input operations by the virtual desktop agent; and encoding a second portion of the sequence of input operations into the digital image by the virtual desktop agent.

10. The computing device of claim 8, wherein the memory further includes instructions that when executed by the at least one processor, cause the computing device to perform the steps of:

by the virtual desktop agent, receiving from an operating system of the virtual desktop a location in the user interface of a user interface element referenced in the sequence of input operations encoded into the digital image; and encoding the location of the user interface element into the digital image.

11. The computing device of claim 8, wherein the memory further includes instructions that when executed by the at least one processor, cause the computing device to perform the steps of:

by the virtual desktop agent, determining information corresponding to the virtual desktop comprising at least one of a type of the virtual desktop and an origin of the virtual desktop, wherein the sequence of input operations received by the virtual desktop agent is determined based on the information determined by the virtual desktop agent.

12. The computing device of claim 8, wherein the memory further includes instructions that when executed by the at least one processor, cause the computing device to perform the steps of:

by the virtual desktop agent, determining information corresponding to the virtual desktop comprising at least one of a type of the virtual desktop and an origin of the virtual desktop;

encoding the information into a digital image by the virtual desktop agent; and displaying the digital image encoded with the information on the user interface of the virtual desktop, wherein the desktop client is configured to decode the digital image displayed in the user interface and convey the information to a controller, wherein the sequence of input operations received by the virtual desktop agent is determined by the controller based on the information received from the desktop client.

13. The computing device of claim 8, wherein the digital image is at least one of a Quick Response (QR) code or a watermark.

14. The computing device of claim 8, wherein the memory further includes instructions that when executed by the at least one processor, cause the computing device to perform the steps of tracking completion of the input operations for benchmarking the virtual desktop.

15. A non-transitory computer readable storage medium for executing workloads to benchmark virtual desktop performance in a virtual desktop environment comprising one or more sequences of instructions, the instructions when executed by one or more processors causing the one or more processors to execute the operations of:

establishing a virtual desktop session between a virtual desktop agent and a desktop client, wherein the virtual desktop agent is configured to stream a user interface of the virtual desktop to the desktop client over a network connection;

by the virtual desktop agent, determining information corresponding to the virtual desktop comprising at least one of a type of operating system of the virtual desktop and where the virtual desktop is hosted, wherein a sequence of input operations for benchmarking performance of the virtual desktop is determined by a controller based on the information corresponding to the virtual desktop;

receiving, by the virtual desktop agent, the sequence of input operations to be performed for benchmarking performance of the virtual desktop;

encoding at least a portion of the sequence of input operations for benchmarking performance of the virtual desktop into a digital image by the virtual desktop agent; and displaying the digital image encoded with the sequence of input operations for benchmarking performance of the virtual desktop on the user interface of the virtual desktop, wherein the desktop client is configured to decode the digital image displayed in the user interface and actuate the sequence of input operations encoded in the digital image.

16. The non-transitory computer readable storage medium of claim 15, further comprising instructions that when executed by the one or more processors cause the one or more processors to execute the operations of:

executing a first portion of the sequence of input operations by the virtual desktop agent; and encoding a second portion of the sequence of input operations into the digital image by the virtual desktop agent.

17. The non-transitory computer readable storage medium of claim 15, further comprising instructions that when executed by the one or more processors cause the one or more processors to execute the operations of:

by the virtual desktop agent, receiving from an operating system of the virtual desktop a location in the user interface of a user interface element referenced in the sequence of input operations encoded into the digital image; and encoding the location of the user interface element into the digital image.

18. The non-transitory computer readable storage medium of claim 15, further comprising instructions that when executed by the one or more processors cause the one or more processors to execute the operations of:

by the virtual desktop agent, determining information corresponding to the virtual desktop comprising at least one of a type of the virtual desktop and an origin of the virtual desktop, wherein the sequence of input operations received by the virtual desktop agent is determined based on the information determined by the virtual desktop agent.

19. The non-transitory computer readable storage medium of claim 15, further comprising instructions that when executed by the one or more processors cause the one or more processors to execute the operations of:

by the virtual desktop agent, determining information corresponding to the virtual desktop comprising at least one of a type of the virtual desktop and an origin of the virtual desktop;

encoding the information into a digital image by the virtual desktop agent; and displaying the digital image encoded with the information on the user interface of the virtual desktop, wherein the desktop client is configured to decode the digital image displayed in the user interface and convey the information to a controller, wherein the sequence of input operations received by the virtual desktop agent is determined by the controller based on the information received from the desktop client.

20. The non-transitory computer readable storage medium of claim 15, wherein the digital image is at least one of a Quick Response (QR) code or a watermark.

21. The non-transitory computer readable storage medium of claim 15, further comprising instructions that when executed by the one or more processors cause the one or more processors to execute the operations of tracking completion of the input operations for benchmarking the virtual desktop.

* * * * *